United States Patent [19]

Mesman

[11] 4,157,210

[45] Jun. 5, 1979

[54] TRAFFIC CHANNELING DEVICE
[75] Inventor: James W. Mesman, Monroe, La.
[73] Assignee: Olinkraft, Inc., West Monroe, La.
[21] Appl. No.: 805,192
[22] Filed: Jun. 9, 1977
[51] Int. Cl.² ............................................. G02B 5/12
[52] U.S. Cl. ................................... 350/97; 248/519
[58] Field of Search ................. 350/97, 106, 105, 104, 350/103; 229/16; 206/304, 152; 404/15, 16, 125; 248/519, 162, 364; 116/28 R, 114 AJ, 173, 63 P

[56] References Cited
U.S. PATENT DOCUMENTS

| | | | |
|---|---|---|---|
| 1,196,842 | 9/1916 | Busenbark | 206/304 |
| 1,355,042 | 10/1919 | Harwood | 206/304 |
| 1,476,319 | 12/1923 | Angier | 206/304 |
| 2,726,222 | 12/1955 | Palmquist et al. | 350/97 |
| 2,754,961 | 7/1956 | Wilson | 206/304 |
| 2,869,504 | 1/1959 | Andrews et al. | 116/63 P |
| 2,935,238 | 5/1960 | Koehler | 116/63 P |
| 3,080,966 | 3/1963 | Kuchenbecker | 206/152 |
| 3,322,093 | 5/1967 | Goland et al. | 350/97 |
| 3,407,926 | 10/1968 | Rosser | 206/304 |
| 3,554,473 | 1/1971 | Rakov et al. | 248/519 |

Primary Examiner—John K. Corbin
Assistant Examiner—B. W. de los Reyes
Attorney, Agent, or Firm—Norvell E. Von Behren; Douglas B. Henderson; David W. Hill

[57] ABSTRACT

A traffic channeling device for positioning on a highway in a normal traffic flow pattern. The channeling device comprises generally a paperboard shell structure which has formed on its lower portion, a plurality of flaps which are utilized in combination with holding means to hold the shell structure in a pre-determined position on the highway. The holding means may comprise a weight being positioned within the shell and in the preferred embodiment the weight may comprise at least one and preferably a plurality of automobile tires being positioned within the shell and on top of the flaps. The paperboard shell also has positioned on the outside thereof warning means for warning the traffic flow that the device has been positioned on the highway in the normal traffic flow with the warning means comprising an adhesive reflecting tape applied to at least a portion of the outside of said shell and preferably to the entire outside shell. The warning means may also comprise a reflective bead-like coating being applied to some portion or all of the outside of the shell.

14 Claims, 15 Drawing Figures

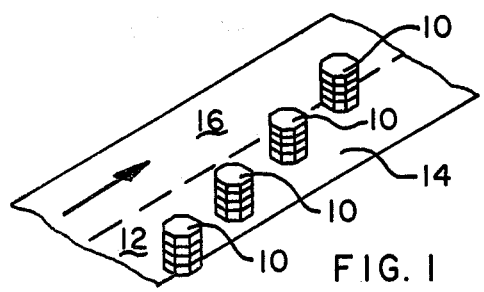
FIG. 1
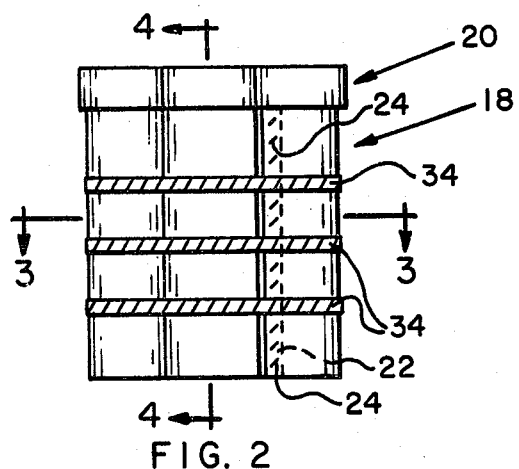
FIG. 2
FIG. 3
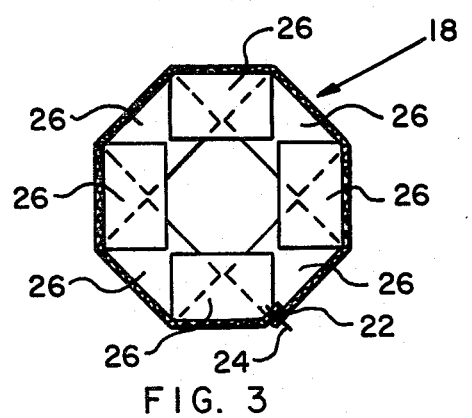
FIG. 4
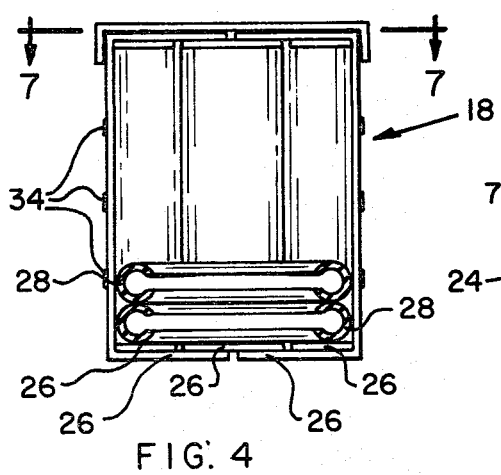
FIG. 9
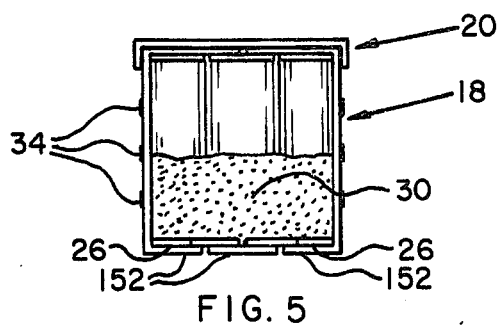
FIG. 5
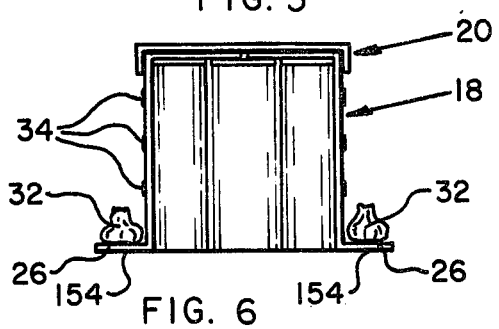
FIG. 6
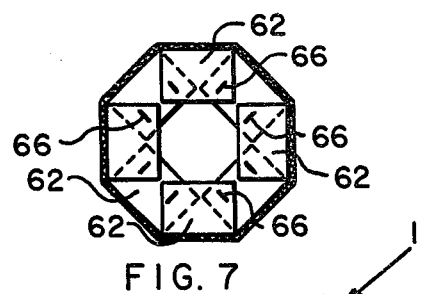
FIG. 7
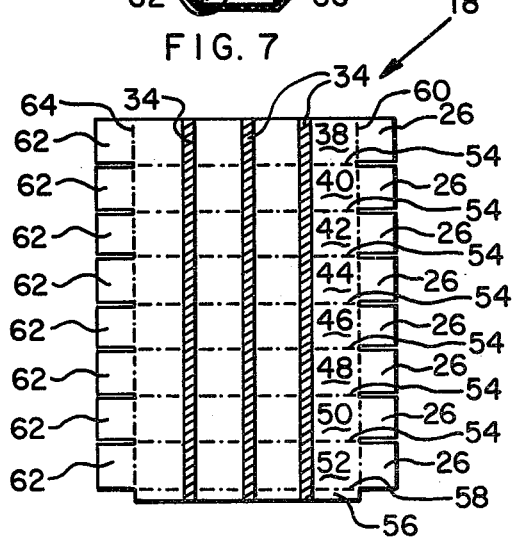
FIG. 8

TRAFFIC CHANNELING DEVICE

BACKGROUND OF THE INVENTION

This invention relates generally to highway traffic channeling devices and more particularly to a new and novel highway traffic channeling device made out of a paperboard shell utilized in combination with warning means and holding means for holding the shell structure on the highway.

Traffic channeling devices are utilized by highway departments in the area of construction in progress and serve the function of channeling the normal traffic which must pass by the construction site generally to one lane or to a different area so that the construction can continue without interrupting traffic flow. The traffic channeling devices normally take the form of steel barrels or plastic barrels and may also take the form of horses or barricades having signs attached thereto indicating that the traffic is to move to another lane. It is also known to use at times stacked automobile tires which are held in position by some sort of center post with all of the prior art barrels being designed primarily to divert or channel the flow of traffic from one lane to another lane.

Some of the problems with the beforementioned prior art type of devices relate to storage problems of the devices, for example, in the case of steel or plastic barrels both before and after construction and also on the job site prior to being placed in position in the traffic flow. Other problems often encountered with the prior art traffic channeling devices such as plastic or steel barrels is that these devices are many times impacted by a passing automobile which can result in safety hazards to the construction workers nearby since the plastic or steel barrel can act like a projectile when hit by the bumper or fender of a passing automobile. Other problems arise in the extreme high cost of the prior art devices when they must be replaced whenever they are damaged as a result of a high speed impact by either a passing car or truck.

Prior art highway safety devices utilizing tires as impact absorbing devices are known in the art as shown in the U.S. Pat. No. 3,848,853, issued Nov. 19, 1974 to Merton B. Way et al and in the U.S. Pat. No. 3,951,384, issued Apr. 20, 1976 to Robert E. Hildreth, Jr. Devices as typified by these two patents are generally permanently anchored to the ground and are primarily used as impact absorbing devices to be placed, for example, in an area that may be hazardous to a driver that strays from the traffic lane or misses a turn.

It is also known to be able to construct multi-sided shipping receptacles that may be utilized with end turned flaps for packaging circular objects such as automobile tires or the like. Prior art of this type is typified by the U.S. Pat. No. 1,196,842, issued Sept. 5, 1916 to W. R. Bussenbark. Such shipping receptacles, while known in the art of packaging, have not to the applicant's knowledge ever been utilized in combination with the other novel features of the applicant's invention to provide a new and novel channeling device.

SUMMARY OF THE INVENTION

In order to overcome these problems inherent in the prior art devices, as well as other problems, there has been provided by the subject invention a new and novel traffic channeling device which comprises a paperboard shell structure which may be quickly set up at the job site and which is utilized with various holding means to hold the shell structure in a predetermined position on the highway with the shell structure also containing warning means for warning the traffic flow that the device has been positioned on the highway in the normal traffic flow.

In the preferred embodiment the paperboard shell structure is made in a rectangular configuration and is sized to hold a given weight which is positioned either within or outside of the shell structure with the weight serving to hold the shell structure in a given position. The warning means may comprise in the preferred embodiment an adhesive reflecting tape being applied to a portion or all of the outside of the shell of the structure and may also comprise a reflective coating such as a bead-like coating being applied to all or a portion of the outside of the shell.

Accordingly, it is an object and advantage of the invention to provide a relatively inexpensive traffic channeling device which may be easily assembled at the job site and which does not act as a high speed projectile whenever hit by an oncoming vehicle.

Another object and advantage of the invention is to provide a paperboard traffic channeling device which has formed thereon a warning means in the form of an adhesive reflecting tape or a reflective coating and which has contained therein means for holding the paperboard shell to the highway in a given position.

Still another object and advantage of the invention is to provide a new and novel paperboard traffic channeling device which eliminates the costly storage problems inherent with the prior art type channeling devices as hereinbefore mentioned.

These and other objects and advantages of the invention will become apparent from a review of the drawings and from a reading of the description of the preferred embodiment, as well as a study of the claims of the subject invention.

BRIEF DESCRIPTION OF THE DRAWINGS

FIG. 1 is a perspective view showing several traffic channeling devices positioned on a highway as normally utilized;

FIG. 2 is a side view showing a preferred embodiment of the subject invention;

FIG. 3 is a cross sectional view, taken along line 3—3 of FIG. 2 showing the interior portion of the subject paperboard traffic channeling device;

FIG. 4 is a sectional view, taken along line 4—4 of FIG. 2, showing the subject traffic channeling device with a top cap in place and having a plurality of automobile tires positioned in the bottom thereof;

FIG. 5 is a view, similar to the view shown in FIG. 4 showing another embodiment of the invention utilizing dirt in place of the plurality of rubber tires;

FIG. 6 is another view similar to FIG. 4 showing another embodiment of the invention utilizing a plurality of sand bags positioned on out-turned flaps of the subject device;

FIG. 7 is a top view, taken along line 7—7 of FIG. 4, showing the top portion of the preferred embodiment with the top cap removed and also the top with a plurality of inturned flaps stapled together giving rigidity to the shell structure;

FIG. 8 is a plan view of the production blank for the paperboard shell showing the location of the respective flaps and placement of the warning means reflector tape of the preferred embodiment;

FIG. 9 is a perspective view of a plurality of the paperboard blanks of the type shown in FIG. 8, showing the assembled blanks held together in a bundle-like fashion which could easily be stacked and stored prior to utilization at the job site;

DESCRIPTION OF THE PREFERRED EMBODIMENT

Figure 10:
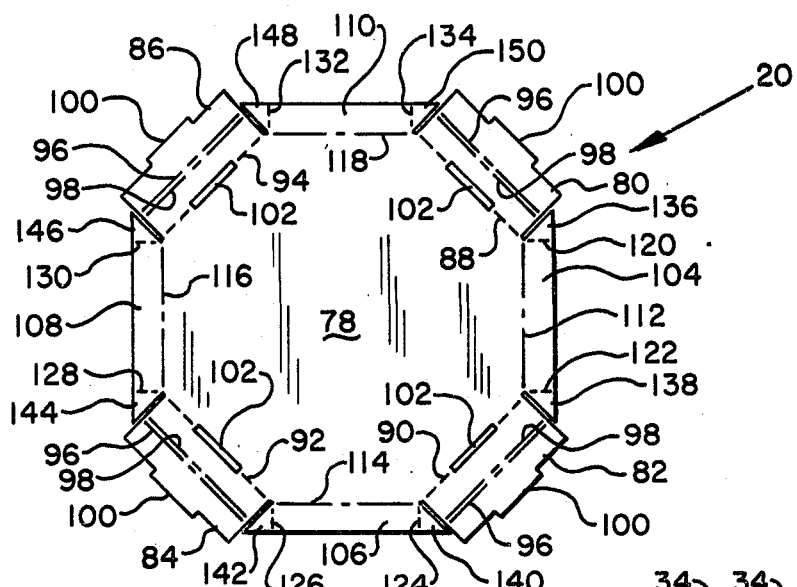
FIG. 10 is a plan view of a production blank for the top cap utilized with the preferred embodiment.

Referring now to the drawings in general and in particular to FIG. 1 of the drawing, there is shown a plurality of traffic channeling devices 10 shown positioned in the right hand traffic lane 12 of the subject highway 14. The purpose of utilizing the traffic channeling devices 10 is to divert the flow of traffic from the right hand lane 12 to the left hand lane 16 in order that some desired construction may be completed in the right hand traffic lane 12 without interrupting flow of traffic on the highway 14.

Turning now to FIGS. 2-4 of the drawing there is shown the new and novel traffic channeling device of the subject invention which may comprise in the preferred embodiment a generally octagonal shape paperboard shell structure shown generally by the numeral 18 which may have placed on the top thereof an octagonal top cap shown generally by the numeral 20. The octagonal shell structure 18 is formed out of corrugated paperboard in the preferred embodiment and is formed with a manufacturer's joint 22 having a plurality of staples 24 applied thereto as is well known in the art.

The paperboard shell structure 18 also has formed on the lower portion thereof a plurality of flaps 26 which are positioned internally in the preferred embodiment but may also be positioned externally as will be described in detail hereinafter.

When the subject traffic channeling device 10 is erected as shown in FIGS. 2-4 of the drawings, there is utilized in combination with the device holding means for holding the shell structure in a predetermined position on the highway. In the preferred embodiment, as shown in FIG. 4 of the drawing, the holding means may comprise at least one automobile tire 28 which is positioned inside the shell structure and on top of the inturned flaps 26. When the automobile tire or tires are positioned within the shell structure 18 it can be seen that they serve as a weight on top of the inturned flaps 26 which will hold the shell structure in some predetermined position on the highway against movement caused by gusts of wind at the job site.

By referring to FIGS. 5 and 6 of the drawing it can be seen variations of the use of automobile tires as the holding means for the device with FIG. 5 showing a given quantity of loose materials such as dirt 30 being positioned within the shell structure 18. And in a like manner, as shown in FIG. 6 of the drawing, the dirt may be positioned within sand bags 32 and placed upon the flaps 26 which have been turned outwardly in this variation and as shown in FIG. 6 of the drawing.

Associated with the outside of the shell structure 18 is warning means for warning the traffic flow that the device has been positioned on the highway in the normal traffic flow. The warning means may comprise in the preferred embodiment an adhesive reflecting tape 34 which is adhered to the outside of the shell structure and is positioned on at least a portion of the outside of the shell and may also be applied to the entire portion of the outside shell as determined by the local and state highway regulations for such warning devices. The adhesive reflecting tape 34 may be manufactured in various desired colors and may be positioned on the outside of the shell structure in whatever pattern is desired by the purchaser of the device and as required by the various regulatory agencies.

It is within the spirit and scope of the invention that the warning means may also comprise a reflective coating being applied to at least a portion of the outside of the shell structure and may also be applied to the entire portion of the outside of the shell structure again as desired by the purchaser or as controlled by regulations. The reflective coating applied may be of a bead-like type similar to coatings used on movie screens and may be formed from other types of coatings manufactured by the producer.

Figure 15:
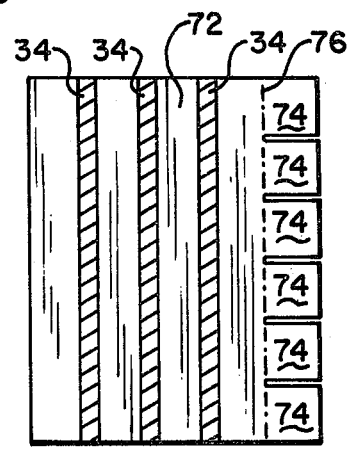
FIG. 15 is a plan view of the production blank for the embodiment of the invention shown in FIG. 14 of the drawings.
Figure 14:
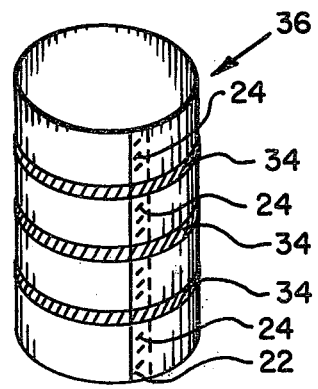
FIG. 14 is a plan view of another embodiment of the subject invention being formed of a different type of paperboard and being formed in a generally cylindrical configuration.

Referring now to FIGS. 14-15 of the drawing there is shown a traffic channeling device of the subject invention constructed in a cylindrical form shown generally in FIG. 14 by the numeral 36. When constructed in this form the shell structure would also comprise a paperboard structure and would be formed preferably out of kraft paper or some combination of paper laminated or coated with some material to prevent moisture from entering the paper structure and destroying the structural stability of it. When the channeling device is formed in the cylindrical shape as shown by the numeral 36 it would also have applied on the outside thereof the adhesive reflecting tape 34 for warning the traffic that the structure has been positioned in the traffic flow. Also, when formed in the cylindrical shape, the paperboard structure would also contain a manufacturer's joint 22 having a plurality of staples 24 positioned therein. It is within the spirit and scope of the invention that the manufacturer's joint 22 may also be glued to the adjacent paperboard panel eliminating the plurality of staples 24 and this variation may also be applied to the octagonal structure shown in FIGS. 1-4. It is also within the spirit and scope of the invention that the paperboard outer shell of the subject device may be formed in other shapes other than octagonal or cylindrical and the subject invention is not to be limited to the particular outer shape of the structural shell. The cylindrical form of FIGS. 14-15 may also be constructed with upper flaps 62 similar to the FIG. 7 octagonal version.

Referring now to FIGS. 7-9 of the drawing there is shown the erected octagonal structural shell of the preferred embodiment in FIG. 7 and there is shown in FIG. 8 the production blank for the octagonal shell prior to its being erected. FIG. 9 shows a plurality of bundles of paperboard shells being banded together for shipment to the job site. When formed as an octagonal structure, the paperboard shell 18 comprises eight rectangular panels 38, 40, 42, 44, 46, 48, 50 and 52 hingedly joined together by a plurality of scorelines 54 with the panel 52 also being joined to a manufacturer's flap 56 by means of a scoreline 58.

In the preferred embodiment shown in FIG. 8 of the drawing, the paperboard shell structure 18 has formed on one side thereof a series of flaps 26 by means of the scoreline 60 running the entire length of the paperboard panel. In addition, the shell structure 18 may have formed on the other side thereof a plurality of flaps 62 by means of the scoreline 64 running the length of the paperboard structure. The scoreline 64 as well as the scoreline 60 and the scorelines 54 are shown by dashed lines in FIG. 8 of the drawing and it is within the spirit and scope of the invention that the paperboard shell can also be constructed with a series of individual panels and flaps being joined together by means of adhesive tape or other joining means rather than by the use of the scorelines as described in the preferred embodiment.

Positioned on the outside of the shell structure and as shown in FIG. 8 of the drawing would be the warning means in the forms of the adhesive reflecting tape which is applied to at least a portion of the outside of the shell or may be applied to the entire outside shell of the structure as described. When the octagonal shell structure 18 is manufactured in FIG. 8 of the drawing utilizing the plurality of flaps 62, the shell structure would then be erected in the octagonal shape shown in FIG. 7 of the drawing and it may be desirable to position the flaps 62 inwardly of the shell as shown in FIG. 7 and it may also be desirable to staple the flaps together by a plurality of staples 66 to give more rigidity to the shell structure.

By the use of a paperboard shell structure similar to that shown in FIG. 8 of the drawing it can readily be seen that the paperboard blank may be manufactured at a corrugating plant and may be partially assembled so that the manufacturer's flap 56 is joined to the panel 38 and is stapled in place by a plurality of staples 24. Thereafter a given quantity of the partially assembled shell structures may then be bundled together as shown in FIG. 9 of the drawing being held in place by several rope or wire ties 68. When prepackaged in this manner the bundle of pre-assembled shells 70 may be easily stored in a warehouse and may be easily shipped to the job site for assembly and erection into the octagonal shell shown in FIG. 2 of the drawing. From this it can be seen that a much greater quantity of the traffic channeling devices may be stored than would be heretofore possible in storage of the prior art type of steel or plastic barrels or automobile tires.

Referring now to FIG. 15 of the drawing there is shown a plan view of the production blank of the version of the traffic channeling device shown in FIG. 14 of the drawing wherein the device is formed in a cylindrical shape with the production blank comprising a generally elongated rectangular panel 72 having a plurality of flaps 74 formed on the one side thereof by means of the elongated scoreline 76. The flaps 74 would then be utilized internally in the structure or externally as desired, and would function in a manner similar to the flaps 26 as shown in FIGS. 2-4 of the drawings. In a similar manner the paperboard shell panel 72 would have applied to the outer side thereof the adhesive reflecting tape 34 as beforementioned and may also have applied thereto a reflective coating in place of the adhesive reflecting tape 34.

Referring now to FIGS. 10-13 there is shown the top cap which may be utilized with the subject invention whenever the channeling device is formed in a generally octagonal shaped configuration. The top cap 20 shown in FIG. 10 comprises a central panel 78 having attached thereto four side panels 80, 82, 84, and 86 by means of the scorelines 88, 90, 92, and 94. The side panels 80-86 also have formed therein a pair of scorelines 96 and 98 midway within the panel as shown in FIG. 10. Formed on the outside of each side panel 80-86 is a tab 100 which is designed to be received within a mating slot 102 whenever the side panel is folded along the scorelines 96 and 98.

The central panel 78 also has formed on four sides thereof a somewhat shorter side panel 104, 106, 108 and 110 which is hingedly attached to the central panel 78 by means of the scorelines 112, 114, 116, and 118. The shorter side panels 104-110 also have placed therein a series of scorelines 120, 122, 124, 126, 128, 130, 132 and 134 forming a series of triangular shaped portions 136, 138, 140, 142, 144, 146, 148 and 150.

Figure 11:
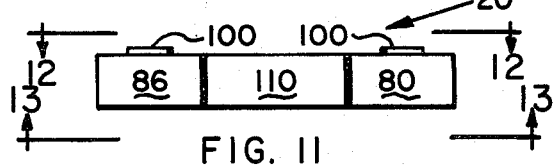
FIG. 11 is a side view of the top cap shown in FIG. 10 showing the top cap assembled.
Figure 12:
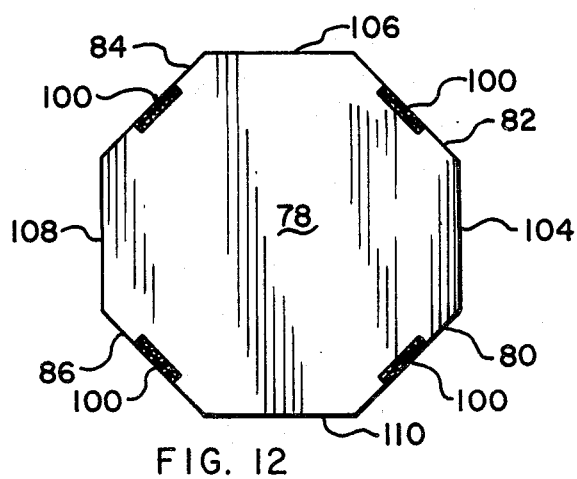
FIG. 12 is a top view, taken along line 12—12 of FIG. 11, showing the top of the assembled top cap.
Figure 13:
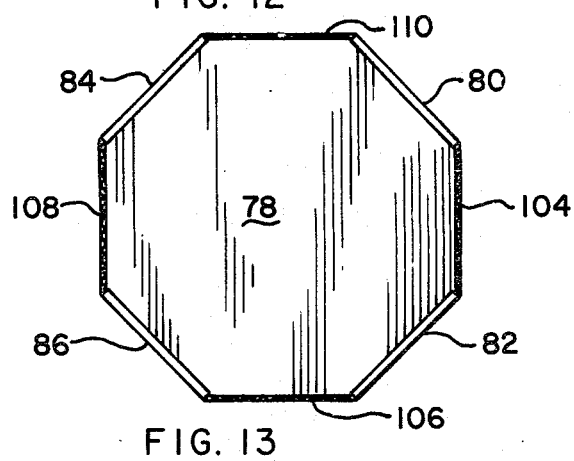
FIG. 13 is a bottom view, taken along line 13—13 of FIG. 11, showing the bottom of an assembled top cap.

In erecting the top cap 20 to the position shown in FIG. 11-13 of the drawing the shorter side panels 104-110 are folded about their respective scorelines 112-118 at an angle of 90 degrees to the face of the central panel 78. Thereafter the longer side panels 80-86 are folded about their respective scorelines 88-94 to a position 90 degrees from the face of the central panel 78. The next step in the erection of the top cap 20 is to fold the triangular shaped portions 136-150 about their respective scorelines 120-134 so that the triangular shaped portions are positioned between the two pieces of the respective longer side panels 80-86 as they are folded about their respective scorelines 96 and 98 with the tabs 100 being inserted into the slots 102 to hold the entire top cap in the position shown in FIGS. 11-13 of the drawings.

When folded in this manner the top cap 20 then becomes octagonal in shape and may be tightly positioned on top of the octagonal shell structure 18 as shown in FIG. 2 of the drawing should it be desired to utilize a top cap with the traffic channeling device. In a like manner should it be desired to use a top cap with the cylindrical configuration of the traffic channeling device as shown in FIGS. 14-15 of the drawing then a circular type top cap would be constructed using known paperboard folding techniques to obtain a top cap for that embodiment.

When the traffic channeling device of the subject invention and its embodiments is constructed of paperboard, either corrugated or kraft paper uncorrugated, it may also be highly desirable to coat the entire paper surface both inside and outside with a weather resistant coating such as a wax coating or a plastic coating of some type and it is within the spirit and scope of the invention that it may also be coated with other types of weather resistant coatings known in the marketplace to be satisfactory for the purpose of coating paperboard.

From the above it can be seen that the subject new and novel traffic channeling device overcomes the difficulties inherent with the prior art type of steel barrels, plastic barrels, stacked automobile tires and other types of heavy, bulky channeling devices. The subject channeling device may be quickly erected at the job site and may be discarded by burning whenever the construction is complete or may also be broken down and stored in the manner shown in FIG. 9 of the drawing thereby greatly reducing the storage space necessary for a large inventory of channeling devices. When the subject new and novel channeling device is struck by a passing car or truck as happens in many cases, the subject device will not become a dangerous projectile which could injure the adjacent construction workers but will simply break apart into a harmless pile leaving the automobile tire or the sand or dirt that has been weighting the channeling device down in a harmless pile in the road.

Should it be desired by the purchaser of the channeling device to eliminate the use of rubber tires, dirt, sand bags or the like to weigh the channeling device down, it is within the spirit and scope of the invention to use holding means in the form of some type of adhesive or other securing material which could be applied to the side of the flaps 26 that is in contact with the roadway. For example, when the flaps 26 would be turned inwardly as shown in FIG. 5 of the drawing the adhesive material would be applied to the surface 152 to securely adhere the channeling device to the roadway so that it would not be blown away by the action of wind or air currents caused by passing cars or trucks. In a like manner, when the flaps 26 would be turned outwardly as shown in FIG. 6 of the drawing, the adhesive material would be applied to the surface 154 of the flaps 26 to thereby hold the channeling device erect. When utilizing adhesives or some other securing material, the dirt 30 or sand bags 32 would probably be eliminated in most cases, however it is within the spirit and scope of the invention that should conditions dictate, these holding means may also be utilized with the adhesive holding means to more securely hold the shell structure on the highway surface.

From the foregoing it can be seen that there has been provided by the subject invention a new and novel traffic channeling device that accomplishes all of the objects and advantages of the invention and many others. It should also be noted that many changes can be made in the structure as shown and in the arrangement of the various parts without departing from the spirit and scope of the invention and the subject invention is not to be limited to the embodiments shown which are given by way of illustration only.

Having described my invention, I claim:

1. A traffic channeling device for positioning on a highway in the normal traffic flow pattern, comprising in combination:
    (a) a moisture-proof paperboard shell structure including a frame having a substantially uniform cross-section and an open end, and having formed on the other end thereof a plurality of flaps, said shell structure being designed for standing on the highway in a vertical position with said open end upward so that at least some of said flaps are in contact with the highway surface, said flaps further being designed so that they may be folded inwardly or outwardly as desired by the user of the device;
    (b) means, associated with the outside of said shell structure, for warning the traffic flow that the device has been positioned on the highway in the normal traffic flow; and
    (c) means, associated with said folded flaps, for holding said vertical standing shell structure in a predetermined position on the highway.

2. The device as defined in claim 1 wherein said warning means comprises an adhesive reflecting tape applied to at least a portion of the outside of said shell.

3. The device as defined in claim 1 wherein said warning means comprises a reflective coating applied to at least a portion of the outside of said shell.

4. The device as defined in claim 1 wherein said holding means comprises a weight being positioned within said shell and on top of said plurality of flaps.

5. The device as defined in claim 1 wherein said holding means comprises at least one automobile tire positioned within said shell and on top of said plurality of flaps.

6. The device as defined in claim 1 wherein said plurality of flaps are turned outward and said holding means comprises a heavy object positioned on top of each flap.

7. The device as defined in claim 1 further comprising a top cap being positioned on top of said vertical standing shell structure to cover said one open end.

8. The device as defined in claim 1 wherein said shell structure is octagonal in shape.

9. The device as defined in claim 8 further comprising a top cap being positioned on top of said vertical standing shell structure to cover said one open end.

10. The device as defined in claim 1 wherein said shell structure is cylindrical in shape.

11. The device as defined in claim 10 further comprising a top cap being positioned on top of said vertical standing shell structure to cover said one open end.

12. The device as defined in claim 1 wherein said holding means comprises an adhesive being applied to said plurality of flaps formed on the lower portion of the paperboard shell structure.

13. The device as defined in claim 1 further comprising said paperboard shell structure also having formed on the upper portion thereof a plurality of flaps.

14. The device as defined in claim 13 wherein the flaps formed on the upper portion of said shell structure are turned inwardly and are stapled together.

* * * * *